(12) United States Patent
Tachibana

(10) Patent No.: US 8,805,071 B2
(45) Date of Patent: Aug. 12, 2014

(54) IMAGE PROCESSING METHOD AN IMAGING DEVICE MODULE

(75) Inventor: Shinsuke Tachibana, Setagaya-ku (JP)

(73) Assignee: Kyocera Corporation, Kyoto (JP)

( * ) Notice: Subject to any disclaimer, the term of this patent is extended or adjusted under 35 U.S.C. 154(b) by 271 days.

(21) Appl. No.: 13/000,330

(22) PCT Filed: Jun. 25, 2009

(86) PCT No.: PCT/JP2009/061580
§ 371 (c)(1),
(2), (4) Date: Dec. 20, 2010

(87) PCT Pub. No.: WO2010/001801
PCT Pub. Date: Jan. 7, 2010

(65) Prior Publication Data
US 2011/0103687 A1     May 5, 2011

(30) Foreign Application Priority Data
Jun. 30, 2008 (JP) .................................. 2008-170209

(51) Int. Cl.
| G06K 9/00 | (2006.01) |
| G06K 9/38 | (2006.01) |
| G06K 9/40 | (2006.01) |
| H04N 5/361 | (2011.01) |

(52) U.S. Cl.
CPC ..................... *H04N 5/361* (2013.01)
USPC ............ 382/168; 382/271; 382/273; 382/274

(58) Field of Classification Search
None
See application file for complete search history.

(56) References Cited

U.S. PATENT DOCUMENTS

| 4,392,157 A | * | 7/1983 | Garcia et al. ................... 348/243 |
| 5,724,456 A | * | 3/1998 | Boyack et al. ................. 382/274 |

(Continued)

FOREIGN PATENT DOCUMENTS

| EP | 1655957 A1 | 5/2006 |
| JP | 09-233389 | 9/1997 |

(Continued)

OTHER PUBLICATIONS

Extended European search report dated Nov. 15, 2011 for corresponding European application 09773379.4 cites the foreign patent document above.

(Continued)

*Primary Examiner* — Stephen R Koziol
*Assistant Examiner* — Jonathan S Lee
(74) *Attorney, Agent, or Firm* — DLA Piper LLP (US)

(57) ABSTRACT

There are provided an image processing method and an imaging device module capable of properly calculating a black level when brightness on the positive maximum value side in a brightness histogram of an optical black region are clipped to an upper limit brightness, that is, when brightness on the positive maximum value side in a brightness histogram of an optical black region exceed an upper limit brightness. An image processing method includes forming a brightness histogram of pixels in an optical black region of an imaging face of an imaging device; shifting the brightness histogram toward where a brightness pixel value is zero until a peak value of the brightness histogram becomes smaller than an upper limit of a pixel value, when the peak value is equal to or larger than the upper limit brightness of the pixel value; and calculating a black level based on a peak value which became smaller than the upper limit.

4 Claims, 3 Drawing Sheets

(56) References Cited

U.S. PATENT DOCUMENTS

| | | | |
|---|---|---|---|
| 2003/0122939 A1* | 7/2003 | Bell et al. | 348/229.1 |
| 2006/0132625 A1 | 6/2006 | Mori | |
| 2006/0239550 A1* | 10/2006 | Pulsifer | 382/168 |
| 2008/0012965 A1 | 1/2008 | Kitani | 348/243 |
| 2008/0291505 A1* | 11/2008 | Shih et al. | 358/461 |
| 2008/0310714 A1* | 12/2008 | Stern et al. | 382/169 |
| 2011/0261226 A1 | 10/2011 | Mori | |

FOREIGN PATENT DOCUMENTS

| | | |
|---|---|---|
| JP | 2006-345458 | 12/2006 |
| JP | 2007-295260 | 11/2007 |
| JP | 2007295260 A * | 11/2007 |
| JP | 2008-022486 | 1/2008 |

OTHER PUBLICATIONS

European office action dated Jul. 31, 2012 issued in corresponding European application 09773379.4.

European office action (decision to refuse a European patent application) dated Aug. 20, 2013 issued in corresponding European application 09773379.4.

EXAR: "XRD98L63 CCD Image Digitizers with CDS, PGA, and 12-Bit A/D—datasheet" EXAR Corporation, Jun. 1, 2003 (URL:// http://www.exar.com/connectivity/data-converters/analog-front-end-afe-and-a-d-combo/xrd98I63).

European office action dated Mar. 28, 2013 issued in corresponding European application 09773379.4 cites the non-patent literature listed above.

* cited by examiner

IMAGE PROCESSING METHOD AN IMAGING DEVICE MODULE

CROSS-REFERENCE TO THE RELATED APPLICATIONS

This application is a national stage of international application No. PCT/JP2009/061580, filed on Jun. 25, 2009, and claims the benefit of priority under 35 USC 119 to Japanese Patent Application No. 2008-170209, filed on Jun. 30, 2008, the entire contents of which are incorporated herein by reference.

TECHNICAL FIELD

The present invention relates to an image processing method and an imaging device module for performing correction of a black level.

BACKGROUND ART

An imaging face of an imaging device having a two-dimensional array of pixels (light-receiving element portions) such as a metal oxide semiconductor (MOS)-type imaging device is ordinarily provided with a light-receiving region for receiving light from a subject and a light-blocked optical black (OB) region disposed adjacent to the light-receiving region. The optical black region has pixels, but light is blocked from the pixels.

The optical black region is provided in order to detect the pixel values of pixels in a state where light is not received. Herein, the pixel value is obtained by photoelectrically converting the amount of light received by a pixel from a subject, and converting the resulting value into a digital value.

By providing an optical black region on an imaging face, it is accomplished that the black level in a state where light from a subject is not received is accurately detected. Accordingly, correction that subtracts the detected black level from an output signal can be performed, so that an image having a correct pixel value can be output.

A plurality of pixel values are generated in the optical black region, and a pixel value histogram obtained by statistically processing these pixel values has a bilaterally symmetric normal distribution. Herein, the average pixel value in the pixel value histogram having a bilaterally symmetric normal distribution is indicated as a pixel value in a level having the maximum frequency. That is to say, the average pixel value in the pixel value histogram is a pixel value in the center level of the pixel value histogram having a bilaterally symmetric normal distribution.

Furthermore, the average pixel value in the pixel value histogram indicates the black level indicating the pixel values of pixels in a state where light is not received.

Furthermore, the black level changes depending on the temperature of an imaging device. When the temperature is high, the pixel values of pixels on an imaging face increase, and, thus, the black level also increases. In an imaging device, correction is performed in consideration of such a change in the black level.

For example, Patent Literature 1 discloses an image processing method including the steps of: forming a pixel value histogram of pixels in an optical black region of an imaging face of a solid imaging device; clipping negative pixel values in the formed pixel value histogram to where a pixel value is zero; taking a median in the pixel value histogram after clipping as a black level; and performing black level correction of an output signal generated at the pixel using the black level as a reference.

Herein, the clipping refers to a phenomenon in which the frequency of pixel values saturates. Hereinafter, a specific description will be given.

In the case where a voltage obtained by a photodiode photoelectrically converting light from a subject is converted into a pixel value, the range of a voltage that can be converted into a pixel value is determined in advance depending on a required sensitivity or image quality. Furthermore, in the case where the maximum voltage within the range where voltages can be converted into a pixel value is converted into a pixel value, that pixel value is defined as an upper limit.

Herein, when photoelectrically converted voltages are converted into pixel values, and the pixel values are larger than the above-described upper limit, the frequencies of the pixel values larger than the upper limit are gathered at the upper limit of the pixel value, and a saturated state occurs. This phenomenon is clipping.

Furthermore, clipping also occurs in the case where pixel values obtained from photoelectrically converted voltages are smaller than where a pixel value is zero. More specifically, this is a phenomenon in which the frequencies of pixel values smaller than where the pixel value is zero are gathered at where the pixel value is zero, and a saturated state occurs.

Figure 3:
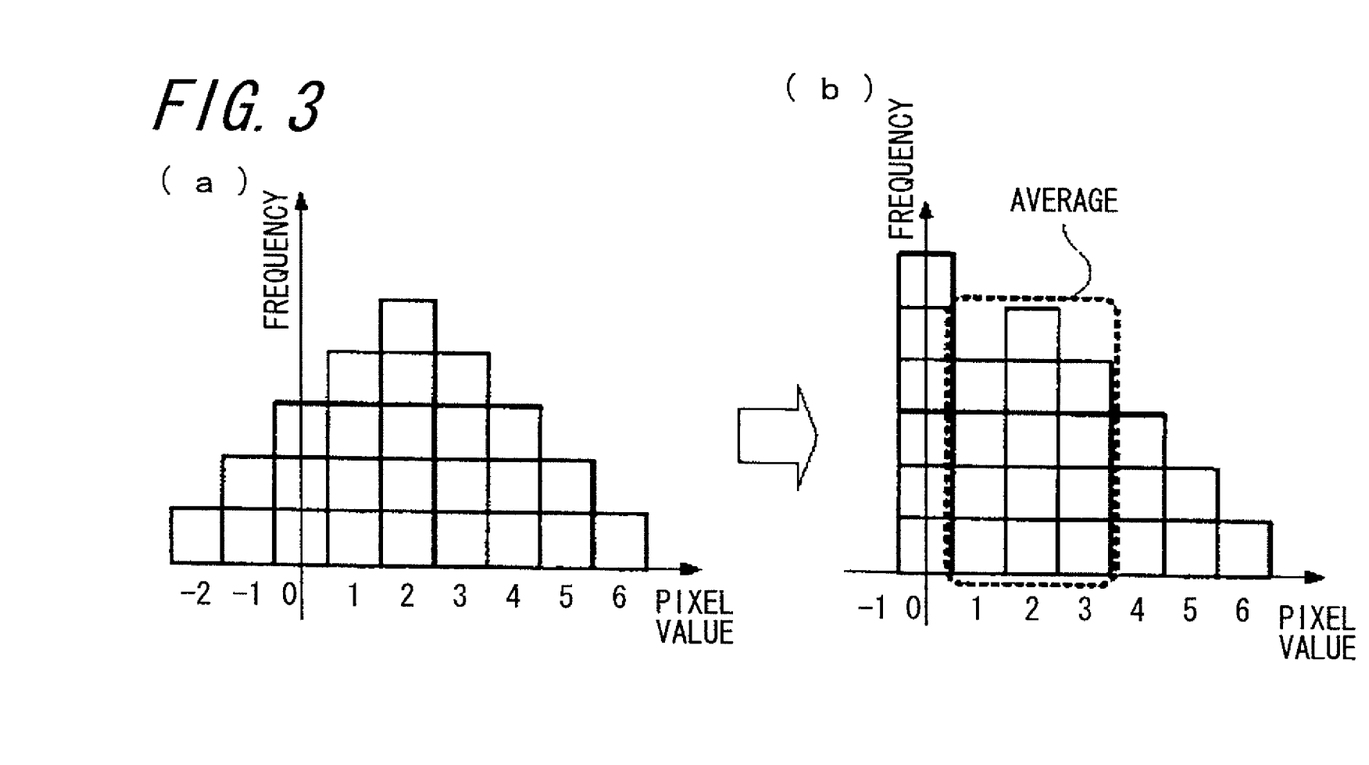
FIG. 3(a) is a histogram before negative pixel values are clipped to where the pixel value is zero.
FIG. 3(b) is a histogram after the negative pixel values are clipped to where the pixel value is zero.

FIGS. 3(a) and 3(b) illustrate the image processing method described in Patent Literature 1. The description in Patent Literature 1 is as follows.

FIG. 3(a) shows a histogram before negative pixel values are clipped to where the pixel value is zero, and FIG. 3(b) shows a histogram after the negative pixel values are clipped to where the pixel value is zero. A signal processing portion calculates a black level in the following manner: in the pixel value histogram after clipping, the average pixel value in a pixel value histogram including only positive pixel values having frequencies not smaller than a predetermined threshold is taken as the black level.

Assuming that the pixel value histogram of the optical black region before the negative pixel values are clipped to where the pixel value is zero is as shown in FIG. 3(a) the average pixel value in the pixel value histogram is 2, and it is reasonable to take this value as the black level.

Hereinafter, a method for calculating the black level when the above-described predetermined frequency threshold is 4 in FIG. 3(b) showing a pixel value histogram after clipping of the optical black region will be described.

First, since the predetermined frequency threshold is set to 4, pixel values that have a frequency of 4 or more and that are not the zero pixel value are selected. Herein, according to FIG. 3(b), three pixel values consisting of pixel values 1, 2, and 3 correspond to the pixel values satisfying these conditions.

Next, the average pixel value in the pixel value histogram is obtained from these three pixel values. Herein, the average pixel value in the pixel value histogram after clipping is a pixel value at the central level of the pixel value histogram as in the case of the average pixel value in the pixel value histogram before clipping. Thus, according to FIG. 3(b), the average pixel value in the pixel value histogram after clipping is naturally 2. This value is reasonable because this is equal to the average pixel value in the pixel value histogram before the negative pixel values are clipped to the pixel value zero. As a result, the pixel value 2 corresponds to the black level in a state where light is not received.

Herein, the predetermined frequency threshold may be freely set. Furthermore, the maximum frequency may be taken as the threshold. In this case, the pixel value of a pixel having the maximum frequency is directly taken as the black level. It means that, in the example shown in FIG. 3(b), the pixel value 2 having the maximum frequency 5 is directly used as the black level,

CITATION LIST

Patent Literature

Patent Literature 1: Japanese Unexamined Patent Publication JP-A 2007-295260

DISCLOSURE OF INVENTION

Technical Problem

However, the conventional image processing method described in Patent Literature 1 describes the method for calculating a black level when negative pixel values are clipped to where a pixel value is zero in the pixel value histogram of the optical black region, but does not consider the case in which pixel values on the positive maximum value side in the pixel value histogram of the optical black region are clipped to an upper limit of a pixel value.

Recently, an imaging device module such as a vehicle-mounted camera module may be used in an environment at a high temperature of approximately 85° C. to 105° C. In this case, as described above, as the temperature of the imaging device module increases, the pixel values of pixels on the imaging face increase. Accordingly, the entire pixel value histogram of the optical black region is shifted toward pixel values on the positive maximum value side. That is to say, in FIGS. 3(a) and 3(b), the entire pixel value histogram is shifted rightward (toward high pixel values) in FIGS. 3(a) and 3(b).

Accordingly, pixel values on the positive maximum value side in the pixel value histogram of the optical black region are easily clipped to the upper limit of the pixel value. Actually, the inventor confirmed through an experiment that pixel values on the positive maximum value side in the pixel value histogram of the optical black region may exceed the upper limit of the pixel value in an environment at a high temperature of approximately 85° C. to 105° C.

Furthermore, in this case, a pixel value at the central level in the pixel value histogram having a bilaterally symmetric normal distribution easily disappears. Accordingly, it becomes difficult to obtain the average pixel value in the pixel value histogram. As a result, it becomes difficult to obtain the black level.

The invention has been made in view of the above-described conventional problem, and it is an object thereof to provide an image processing method and an imaging device module capable of properly calculating a black level in the case where pixel values on the positive maximum value side in a pixel value histogram of an optical black region are clipped to an upper limit of a pixel value, that is, in the case where pixel values on the positive maximum value side in a pixel value histogram of an optical black region exceed an upper limit of a pixel value.

Solution to Problem

The invention provides an image processing method, comprising: forming a pixel value histogram of pixels in an optical black region of an imaging face of an imaging device; shifting the pixel value histogram toward where a pixel value is zero until a peak value of the pixel value histogram becomes smaller than an upper limit of a pixel value, when the peak value is equal to or larger than the upper limit of the pixel value; and calculating a black level based on the peak value which became smaller than the upper limit.

Furthermore, the image processing method of the invention preferably further comprises excluding a zero-clipped component clipped to where the pixel value is zero in the pixel value histogram and forming a pixel value histogram again, when the zero-clipped component is generated by shifting the pixel value histogram toward where the pixel value is zero.

The invention provides an imaging device module, comprising: an imaging device; means configured to form a pixel value histogram of pixels in an optical black region of an imaging face of the imaging device; means configured to shift the pixel value histogram toward where a pixel value is zero until a peak value of the pixel value histogram becomes smaller than an upper limit of a pixel value, when the peak value is equal to or larger than the upper limit of the pixel value; and means configured to calculate a black level based on the peak value which became smaller than the upper limit.

Furthermore, the imaging device module of the invention preferably further comprises means configured to exclude a zero-clipped component clipped to where the pixel value is zero in the pixel value histogram and form a pixel value histogram again, when the zero-clipped component is generated by shifting the pixel value histogram toward where the pixel value is zero.

Advantageous Effects of Invention

The image processing method of the invention includes forming a pixel value histogram of pixels in an optical black region of an imaging face of an imaging device; shifting the pixel value histogram toward where a pixel value is zero until a peak value of the pixel value histogram becomes smaller than an upper limit of a pixel value, when the peak value is equal to or larger than the upper limit of the pixel value; and calculating a black level based on the peak value which became smaller than the upper limit. Accordingly, it is possible to solve the conventional problem that, in the case where the imaging device module is used in an environment at a high temperature of approximately 85° C. to 105° C., pixel values on the positive maximum value side in the pixel value histogram of the optical black region are clipped to the upper limit of the pixel value, and, when the peak value of the pixel value histogram is equal to or larger than the upper limit of the pixel value, the black level cannot be correctly calculated.

That is to say, with the image processing method of the invention, the entire pixel value histogram is shifted toward where the pixel value is zero until a peak value of the pixel value histogram becomes smaller than an upper limit of a pixel value, when the peak value is equal to or larger than the upper limit of the pixel value. Accordingly, the peak value can be prevented from being clipped to the upper limit of the pixel value and substantially disappearing. As a result, the black level can be calculated based on the peak value of the pixel value histogram.

Furthermore, the image processing method of the invention preferably further includes excluding a zero-clipped component clipped to where the pixel value is zero in the pixel value histogram and forming a pixel value histogram again, when the zero-clipped component is generated by shifting the pixel value histogram toward where the pixel value is zero. Accordingly, even when the zero-clipped component is larger than the peak value, it is possible to easily detect the peak value through detection of the maximum frequency value, by excluding the zero-clipped component. Furthermore, even when a zero-clipped component is generated, the peak value is hardly clipped to where the pixel value is zero, and, thus, it is possible to easily calculate the correct black level without requiring fine control of the shift amount of the pixel value histogram.

The imaging device module of the invention includes an imaging device; means configured to form a pixel value histogram of pixels in an optical black region of an imaging face of the imaging device; means configured to shift the pixel value histogram toward where a pixel value is zero until a peak value of the pixel value histogram becomes smaller than an upper limit of a pixel value, when the peak value is equal to or larger than the upper limit of the pixel value; and means configured to calculate a black level based on the peak value which became than the upper limit. Accordingly, an imaging device module is obtained that can solve the conventional problem that, in the case where the imaging device module is used in an environment at a high temperature of approximately 85° C. to 105° C., pixel values on the positive maximum value side in the pixel value histogram of the optical black region are clipped to the upper limit of the pixel value, and, when the peak value of the pixel value histogram is equal to or larger than the upper limit of the pixel value, the black level cannot be correctly calculated.

That is to say, with the imaging device module of the invention, the entire pixel value histogram is shifted toward where the pixel value is zero until a peak value of the pixel value histogram becomes smaller than an upper limit of a pixel value, when the peak value is equal to or larger than the upper limit of the pixel value. Accordingly, the peak value can be prevented from being clipped to the upper limit of the pixel value and substantially disappearing. As a result, an imaging device module is obtained that can calculate the black level based on the peak value of the pixel value histogram.

Furthermore, the imaging device module of the invention preferably further includes means configured to exclude a zero-clipped component clipped to where the pixel value is zero in the pixel value histogram and form a pixel value histogram again, when the zero-clipped component is generated by shifting the pixel value histogram toward where the pixel value is zero. Accordingly, even when the zero-clipped component is larger than the peak value, it is possible to easily detect the peak value through detection of the maximum frequency value, by excluding the zero-clipped component. Furthermore, even when a zero-clipped component is generated, the peak value is hardly clipped to where the pixel value is zero, and, thus, an imaging device module is obtained that can easily calculate the correct black level without requiring fine control of the shift amount of the pixel value histogram.

BRIEF DESCRIPTION OF DRAWINGS

FIG. 1(a) is the entire pixel value histogram when a peak value is equal to or larger than an upper limit of a pixel value, FIG. 1(a1) is a pixel value histogram showing the state in which a peak value is clipped to an upper limit of a pixel value, FIG. 1(b) is a pixel value histogram that has been shifted as a whole toward where the pixel value is zero until a peak value becomes smaller than an upper limit of a pixel value, and FIG. 1(b1) is a pixel value histogram in the state where a peak value is not clipped to the upper limit, and the frequency of the peak value can be determined.

DESCRIPTION OF EMBODIMENTS

Hereinafter, an example of an embodiment of an image processing method and an imaging device module of the invention will be described in detail.

In the following description, a peak value refers to a pixel value having the maximum frequency in a pixel value histogram of an optical black region. That is to say, in a pixel value histogram of an optical black region having a bilaterally symmetric normal distribution, a peak value is the same as an average pixel value in the pixel value histogram.

The image processing method of this embodiment includes forming a pixel value histogram of pixels in an optical black region of an imaging face of an imaging device; shifting the pixel value histogram toward where a pixel value is zero until a peak value of the pixel value histogram becomes smaller than an upper limit of a pixel value, when the peak value is equal to or larger than the upper limit of the pixel value; and calculating a black level based on the peak value which became smaller than the upper limit.

With the above-described configuration, it is possible to solve the conventional problem that, in the case where the imaging device module is used in an environment at a high temperature of approximately 85° C. to 105° C., pixel values on the positive maximum value side in the pixel value histogram of the optical black region are clipped to the upper limit of the pixel value, and, when the peak value of the pixel value histogram is equal to or larger than the upper limit of the pixel value, the black level cannot be correctly calculated.

That is to say, the entire pixel value histogram is shifted toward where the pixel value is zero until a peak value of the pixel value histogram becomes smaller than an upper limit of a pixel value, when the peak value is equal to or larger than the upper limit of the pixel value. Accordingly, the peak value can be prevented from being clipped to the upper limit of the pixel value and substantially disappearing. As a result, the black level can be calculated based on the peak value of the pixel value histogram.

Figure 1:
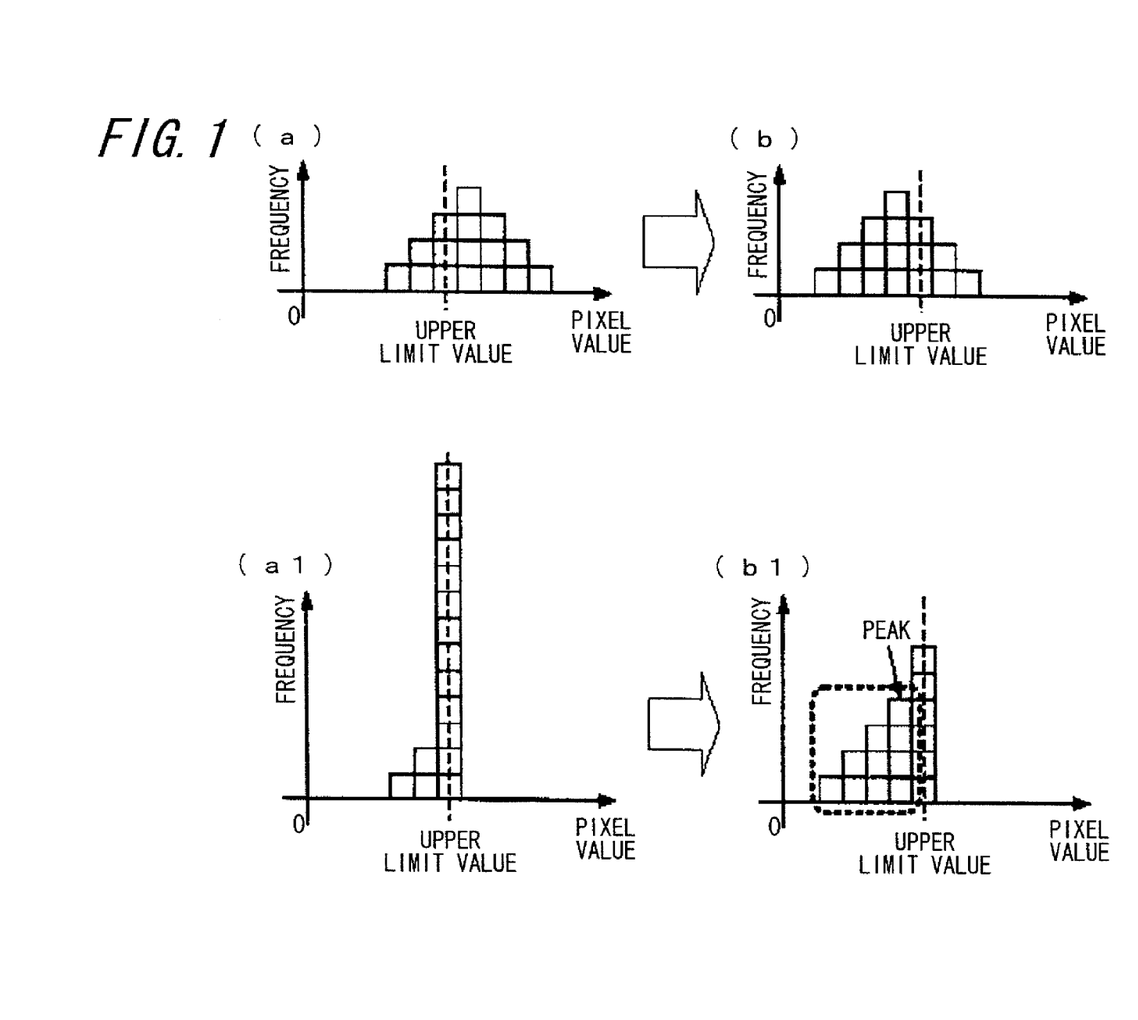
FIG. 1 shows pixel value histograms of an optical black region in examples of an embodiment of an image processing method of the invention, where

FIG. 1 shows pixel value histograms of the optical black region specifically showing examples of an embodiment of the image processing method of the invention. FIG. 1(a) is a histogram showing the entire pixel value histogram of the optical black region when the peak value of the pixel value histogram is equal to or larger than an upper limit of a pixel value. In this case, actually, as shown in FIG. 1(a1), the peak value of the pixel value histogram is clipped to the upper limit of the pixel value, the maximum frequency and the level having the maximum frequency are significantly changed from those in the actual distribution, and the peak value as the pixel value in the level having the maximum frequency substantially disappears. That is to say, the peak value cannot be determined.

Thus, in this example, processes as shown in the histograms in FIGS. 1(b) and 1(b1) are performed. As shown in FIG. 1(b), when the peak value of the pixel value histogram of the optical black region is equal to or larger than the upper limit of the pixel value, the entire pixel value histogram is shifted toward where the pixel value is zero until the peak value becomes smaller than the upper limit. Accordingly, as shown in FIG. 1(b1), the peak value of the pixel value histogram is not clipped to the upper limit, and the peak value can be determined as the pixel value in the level having the maximum frequency. Accordingly, this peak value can be taken as the black level. The reason for this is that the pixel value histogram of the optical black region shows a bilaterally symmetric normal distribution, and the peak value at the center thereof can be taken as an average value (black level).

Alternatively, the peak value whose frequency can be determined without being clipped to the upper limit and left and right pixel values thereof may be added, and the average value of these pixel values may be obtained as the black level.

Furthermore, as shown in FIG. 1(b1), in the case where the peak value of the pixel value histogram is positioned adjacent to a component of the pixel values clipped to the upper limit (upper limit value-clipped component), it may be difficult to determine whether or not the peak value of the pixel value histogram is correct. In this case, a frequency in the level clipped to the upper limit (frequency GK: 6, which is the frequency in the level on the right end in the example shown in FIG. 1(b1)) is compared with the total frequency (frequency GS: 3+2+1=6) of levels of pixel values (the third, the fourth, and the fifth (left end) levels from the right) smaller than the level (the second level from the right) of a pixel value that seems to be the peak value adjacent to the frequency in the level clipped to the upper limit (frequency GK=6), and, in the case where the frequency GK is equal to the frequency GS (GK=GS=6 in the example shown in FIG. 1(b1)), the pixel value that seems to be the peak value adjacent to the upper limit-clipped component (the pixel value in the second level from the right in the example shown in FIG. 1(b1)) can be obtained as the correct peak value.

Furthermore, in the step of shifting the pixel value histogram toward where a pixel value is zero until a peak value of the pixel value histogram becomes smaller than an upper limit of a pixel value, when the peak value is equal to or larger than the upper limit of the pixel value, it is preferable that the pixel value histogram is shifted toward where the pixel value is zero while a total frequency GK of levels of pixel values clipped to the upper limit is compared with a total frequency GK1 of levels of pixel values not clipped to the upper limit, and the pixel value in the level adjacent to the level of the pixel values clipped to the upper limit when GK1 becomes larger than GK is taken as the peak value. In this case, the peak value of the pixel value histogram can be reliably detected.

Furthermore, in the step of shifting the pixel value histogram toward where a pixel value is zero until a peak value of the pixel value histogram becomes smaller than an upper limit of a pixel value, when the peak value is equal to or larger than the upper limit of the pixel value, it is preferable that the level of a pixel value functioning as the upper limit is taken as an nth level, and a pixel value in an (n−2)th level is taken as the peak value when a value obtained by subtracting the frequency of a pixel value in an (n−1)th level from the frequency of the pixel value in the (n−2)th level first becomes a positive value. Also in this case, the peak value of the pixel value histogram can be reliably detected.

Herein, in the pixel value histogram of the optical black region, in the case where the pixel value is an 8-bit digital signal, the upper limit of the pixel value on the horizontal axis is 256. In the case where the pixel value is a 10-bit digital signal, the upper limit of the pixel value on the horizontal axis is 1024.

Figure 2:
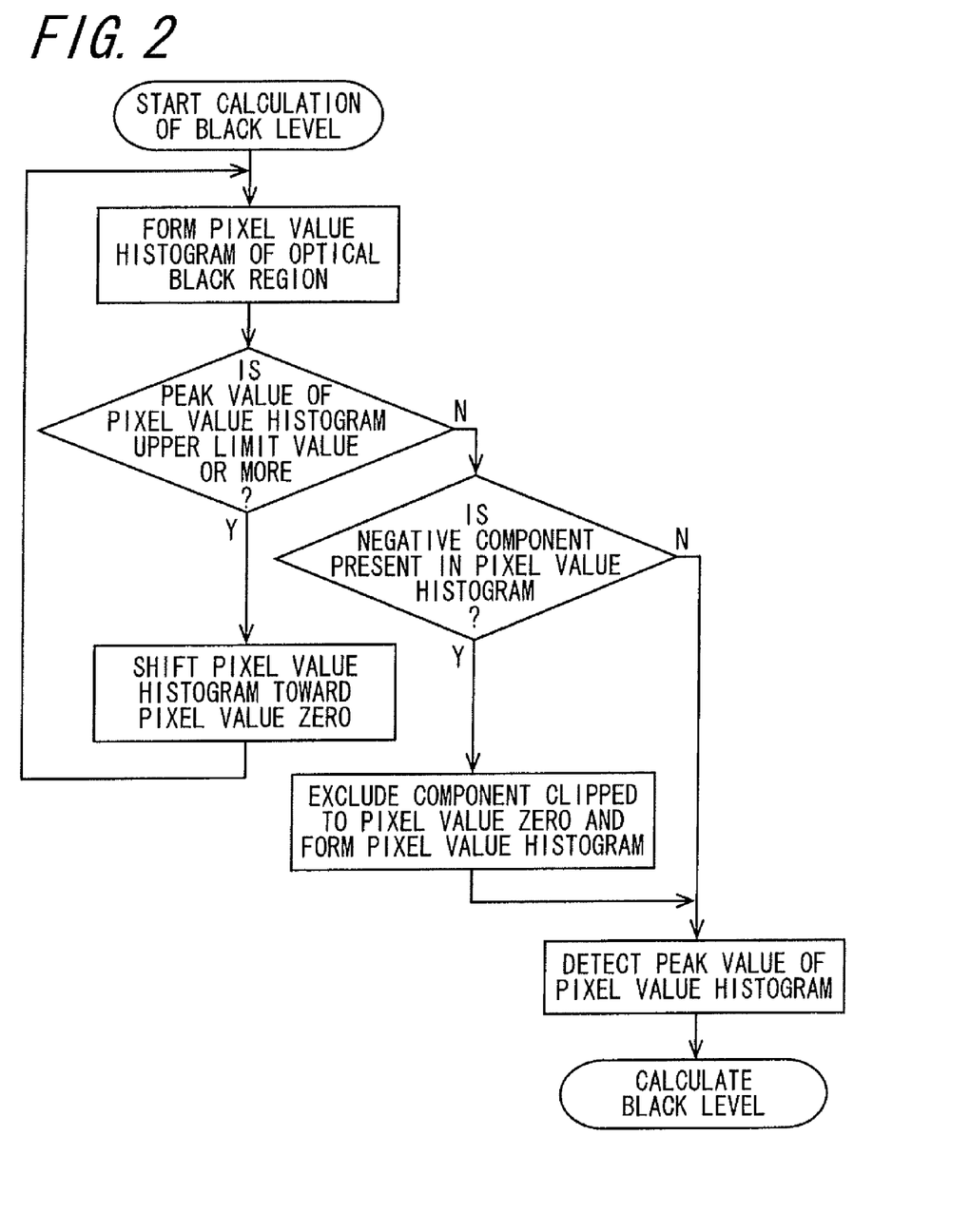
FIG. 2 is a flowchart illustrating an example of an embodiment of an image processing method of the invention.

FIG. 2 is a flowchart illustrating an example of an embodiment of the image processing method of the invention. First, when calculation of the black level is started, a pixel value histogram of an optical black region is formed.

Next, it is determined whether or not a peak value of the pixel value histogram of the optical black region is equal to or larger than an upper limit of a pixel value due to the temperature environment of the imaging device module or the like. In the case where the peak value is equal to or larger than the upper limit of the pixel value, the image processing method in this example is used to shift the entire pixel value histogram toward where the pixel value is zero. The peak value of the pixel value histogram is set to be smaller than the upper limit by performing this process once or more.

Next, after the peak value of the pixel value histogram is set to be smaller than the upper limit, it is determined whether or not a negative component (a zero-clipped component) is present in the pixel value histogram. In the case where no zero-clipped component is present, the black level is calculated based on the peak value of the pixel value histogram. In the case where a zero-clipped component is present, the zero-clipped component is excluded, and a pixel value histogram is formed again. In the case where a pixel value histogram is formed again, even when the zero-clipped component is larger than the peak value, it is possible to easily detect the peak value through detection of the maximum frequency value, by excluding the zero-clipped component. Furthermore, even when a zero-clipped component is generated, the peak value is hardly clipped to where the pixel value is zero, and, thus, it is possible to easily calculate the correct black level without requiring fine control of the shift amount of the pixel value histogram.

The imaging device module of the invention includes an imaging device; means configured to form a pixel value histogram of pixels in an optical black region of an imaging face of the imaging device; means configured to shift the pixel value histogram toward where a pixel value is zero until a peak value of the pixel value histogram becomes smaller than an upper limit of a pixel value, when the peak value is equal to or larger than the upper limit of the pixel value; and means configured to calculate a black level based on a peak value which became smaller than the upper limit.

With this configuration, an imaging device module is obtained that can solve the conventional problem that, in the case where the imaging device module is used in an environment at a high temperature of approximately 85° C. to 105° C., pixel values on the positive maximum value side in the pixel value histogram of the optical black region are clipped to the upper limit of the pixel value, and, when the peak value of the pixel value histogram is equal to or larger than the upper limit of the pixel value, the black level cannot be correctly calculated.

That is to say, with the imaging device module of the invention, the entire pixel value histogram is shifted toward where the pixel value is zero until a peak value of the pixel value histogram becomes smaller than an upper limit of a pixel value, when the peak value is equal to or larger than the upper limit of the pixel value. Accordingly, the peak value can be prevented from being clipped to the upper limit of the pixel value and substantially disappearing. As a result, an imaging device module is obtained that can calculate the black level based on the peak value of the pixel value histogram.

Furthermore, the imaging device module of the invention preferably further includes means configured to exclude a zero-clipped component clipped to where the pixel value is zero in the pixel value histogram and form a pixel value histogram again, when the zero-clipped component is generated by shifting the pixel value histogram toward where the pixel value is zero. Accordingly, even when the zero-clipped component is larger than the peak value, it is possible to easily detect the peak value through detection of the maximum frequency value, by excluding the zero-clipped component. Furthermore, even when a zero-clipped component is generated, the peak value is hardly clipped to the pixel value zero, and, thus, an imaging device module is obtained that can easily calculate the correct black level without requiring fine control of the shift amount of the pixel value histogram.

The imaging device module of the invention specifically includes the following devices as an example of the embodiment. The imaging device module has an imaging device such as a metal oxide semiconductor (MOS)-type imaging device. An imaging face of this imaging device has a two-dimensional array of pixels (light-receiving element portions) in which there are a light-receiving region for receiving light from a subject and a light-blocked optical black (OB) region disposed adjacent to the light-receiving region. The optical black region has pixels, but light is blocked from the pixels.

Furthermore, the imaging device module has a lens unit as an optical device for receiving light, a known diaphragm and shutter provided in an ordinary camera, and the like. Moreover, an auto-focus driving function is provided. The auto-focus driving function is, for example, to control exposure and adjust focus. Herein, the lens unit may be of a fixed focus type. Light from a subject passes through the lens unit, is received by the imaging device, and is photoelectrically converted to give an image signal. This image signal is outputted to a first image signal processing portion connected to the imaging device. The first image signal processing portion performs processes such as correlated double sampling (CDS), automatic gain control (AGC), and analog-to-digital conversion (A-D conversion) on the image signal.

Furthermore, the imaging device module may have a buffer storage device. The buffer storage device is a storage device for storing an image signal digitalized by the first image signal processing portion, and outputs the temporarily stored image signal to a second image signal processing portion.

The second image signal processing portion includes means configured to form a pixel value histogram of pixels in an optical black region of an imaging face of the imaging device (referred to as "means a"); means configured to shift the pixel value histogram toward where a pixel value is zero until a peak value of the pixel value histogram becomes smaller than an upper limit of a pixel value, when the peak value is equal to or larger than the upper limit of the pixel value (referred to as "means b"); and means configured to calculate a black level based on the peak value which became smaller than the upper limit (referred to as "means c").

These means a to c is included in the second image signal processing portion, and realized, for example, as a microcomputer including an integrated circuit-mounted electronic device such as an IC or an LSI on which arithmetic software or signal processing software is installed.

Furthermore, the second image signal processing portion may include, for example, means configured to perform imaging while setting an image signal including a signal in the optical black region to a pixel value higher by an offset value, or means configured to perform black level correction that subtracts a calculated black level from an image signal; means configured to perform white balance correction; and means configured to perform gamma correction.

The imaging device module of the invention may be further comprises the following devices.

The imaging device module may have a monitor device including a liquid crystal display device, an electroluminescence (EL) device, an organic EL device, a plasma display device, or the like. The monitor device displays an image outputted from the second image signal processing portion.

Furthermore, the imaging device module may have a storage device configured to store an image signal on which the image process has been performed by the second image signal processing portion.

Furthermore, the imaging device module may have a control device including a timing signal generating device functioning as a generating portion of a digital signal and a timing control portion of the digital signal; and a processor configured to control driving of the entire imaging device module.

Furthermore, the imaging device module may comprises an operation device configured to control a diaphragm and a shutter of the imaging device module, further adjustment of an image displayed on the monitor device, and the like. This operation device includes a vehicle-mounted navigation device having operation buttons, a personal computer configured to perform operations with keys as operation buttons, or the like.

The imaging device module of the invention can be applied not only as a vehicle-mounted imaging device module but also as a communication imaging device module disposed on a personal computer or the like, a communication imaging device module disposed on a portable communication device such as a portable phone, and the like. In particular, the imaging device module of the invention can be preferably used as a vehicle-mounted imaging device module that is often used in an environment at a high temperature of approximately 85° C. to 105° C. due to frequent exposure to the sun outdoors.

The invention claimed is:

1. An image processing method, comprising:
    forming a first pixel value histogram of pixels in an optical black region of an imaging face of an imaging device;
    when a pixel value of a peak value of the first pixel value histogram is equal to or larger than an upper limit of the pixel value, forming a shifted pixel value histogram by shifting the first pixel value histogram toward where a pixel value is zero until a total frequency in levels of pixel values not clipped to the upper limit becomes larger than a frequency in a level of a pixel value clipped to the upper limit; and
    calculating a black level based on a pixel value adjacent to the upper limit of the shifted pixel value histogram.

2. The image processing method according to claim 1, further comprising:
    excluding a zero-saturated component gathered to where the pixel value is zero in the first pixel value histogram and forming a second pixel value histogram, when the zero-saturated component is generated by shifting the first pixel value histogram toward where the pixel value is zero.

3. An imaging device module, comprising:
    an imaging device;
    means configured to form a first pixel value histogram of pixels in an optical black region of an imaging face of the imaging device;
    means configured to, when a pixel value of a peak value of the first pixel value histogram is equal to or larger than an upper limit of the pixel value, form a shifted pixel value histogram by shifting the first pixel value histogram toward where a pixel value is zero until a total frequency in levels of pixel values not clipped to the upper limit becomes larger than a frequency in a level of a pixel value clipped to the upper limit; and
    means configured to calculate a black level based on a pixel value adjacent to the upper limit of the shifted pixel value histogram.

4. The imaging device module according to claim 3, further comprising:
    means configured to exclude a zero-saturated component gathered to where the pixel value is zero in the first pixel value histogram and form a second pixel value histogram, when the zero-saturated component is generated by shifting the first pixel value histogram toward where the pixel value is zero.

* * * * *